Oct. 5, 1965 O. J. KOHOUT ETAL 3,210,572

ASTABLE MULTIVIBRATOR EMPLOYING VOLTAGE FOLLOWING MEANS AND DIODE ISOLATING TIMING NETWORK IN CROSS COUPLING CONNECTIONS

Filed Oct. 18, 1963 2 Sheets-Sheet 1

INVENTORS
Otto J. Kohout
Leland A. Melugin

BY C. A. Gullbrandsen
ATTY.

Oct. 5, 1965 O. J. KOHOUT ETAL 3,210,572

ASTABLE MULTIVIBRATOR EMPLOYING VOLTAGE FOLLOWING MEANS AND DIODE ISOLATING TIMING NETWORK IN CROSS COUPLING CONNECTIONS

Filed Oct. 18, 1963 2 Sheets-Sheet 2

INVENTORS
Otto J. Kohout
Leland A. Melugin

BY C. A. Gulbrandsen

ATTY.

3,210,572

ASTABLE MULTIVIBRATOR EMPLOYING VOLTAGE FOLLOWING MEANS AND DIODE ISOLATING TIMING NETWORK IN CROSS COUPLING CONNECTIONS

Otto J. Kohout, Westchester, Ill., and Leland A. Melugin, Orlando, Fla., assignors to Automatic Electric Laboratories, Inc., Northlake, Ill., a corporation of Delaware Filed Oct. 18, 1963, Ser. No. 317,222
4 Claims. (Cl. 307—88.5)

This invention relates to multivibrator circuit arrangements, and more particularly to multivibrator circuits which provide a large ratio of period to pulse duration. The invention also relates to a dial pulse generator including multivibrator circuits of the above kind.

A large ratio of period to pulse duration could be achieved by using the conventional multivibrator and having a small resistance charging the circuit's large capacitor during the interval of the short pulse. For this type of an arrangement, large currents would be necessary.

The conventional transistor multivibrator has a maximum realizable period due to the effect of the transistor's loading upon the circuit. When large periods are needed this limitation becomes an extremely undesirable barrier.

The conventional astable multivibrator circuit has a non starting defect which may occur from initial power turn on, and, depending upon the biasing, cause the transistors to be driven simultaneously into permanent cutoff or saturation.

Conventional transistor multivibrator circuits do not have protective circuitry to prevent transistor burn out from large instantaneous capacitor charging current.

A primary object of this invention is to provide a low resistance charging current path for timing capacitors of a multivibrator without substantially increasing current drain.

An additional primary object is to increase the maximum period capability of the multivibrator circuit.

Another object is to provide circuit starting reliability.

An additional object is to provide means to prevent transistor shorting from high instantaneous charging and discharging currents.

A further object is to produce a dial pulse generator by using a combination of multivibrator circuits.

The details of the invention will be explained in the description which follows. Reference is made to the drawing in which.

Figure 1:
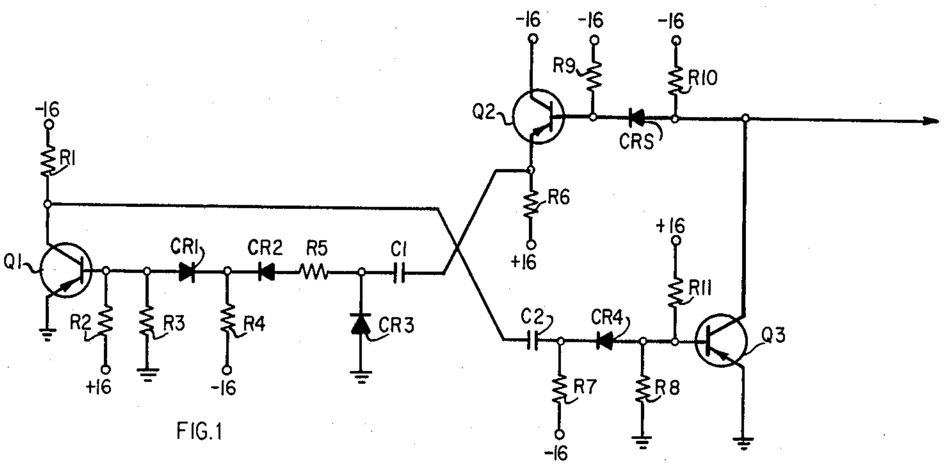
FIGURE 1 is a schematic diagram of an astable multivibrator circuit including two amplifiers and an emitter follower.

With reference to FIG. 1, the circuit illustrates an astable multivibrator with a large period to pulse duration. Transistor Q1 and Q3 are amplifiers which are alternately turned on and off by pulses coupled from the output of one amplifier to the input of the other and vice versa. Each coupling circuit has a timing network which determines the amplifier's on and off time. One timing circuit interposed between Q1 and Q3 includes resistor R1 connected to capacitor C2 and the collector of transistor Q1, resistor R7 connected to capacitor C2 and diode CR4, resistor R8 connected to diode CR4, resistor R11 and the base of transistor Q3. The second timing circuit interposed between Q1 and Q3 includes R2 connected to resistor R3, diode CR1 and the base of transistor Q1, resistor R4 connected to diodes CR1 and CR2, capacitor C1 connected on one side to diode CR3 and resistor R5, and on the other side to resistor R6 and the emitter of Q2, diode CR5 connected on one side to resistor R9 and the base of transistor Q2, and on the other side to resistor R10 and the collector of Q3.

The emitter follower which is included in said second timing circuit provides a low resistive path for the multivibrator during the portion of the period when the large capacitor C1 is being charged to the value of the negative supply voltage. In addition, the high output impedance of the emitter follower enables a longer period to be realized because it isolates from transistor Q1 the loading of transistor Q3. The diode arrangement especially CR1, CR2, CR4 and CR5 also aid in isolating the amplifier networks during different intervals of a cycle.

Figure 1A:
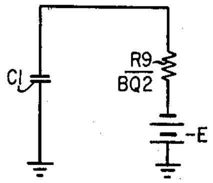
FIGURES 1A, 1B, 1C and 1D illustrate the operative timing networks of the schematic in FIG. 1 during different intervals of a cycle.
Figure 1B:
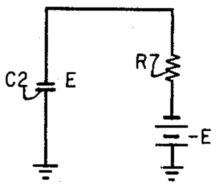

Considering the interval of the short pulse, transistor Q1 is "on" and transistor Q3 is cutoff, and capacitor C1 finds a low resistive path to the negative supply through the emitter follower transistor, Q2, as shown in FIG. 1A. The opposite side of capacitor C1 is grounded by way of diode CR3. Diode CR2 prevents current of capacitor C1 from finding ground through the base-emitter junction of Q1. Q1 is biased "on" because of the negative voltage impressed on its base due to the voltage dividing effect of the resistive combination of R4, R3, and R2 acting with the +16 and −16 volt supply. Diode CR1 offers no appreciable resistance to this current flow. Q3 is "off" due to the positive pulse coupled from the collector of Q1 back biasing diode CR4, and thereby preventing Q3 from receiving any negative biasing voltage from R7 in series with the negative supply. Positive biasing is derived from the R8 and R11 resistive divider. Referring to FIG. 1B, Q3 will be held "off" until C2 is charged up sufficiently from R7 in series with the negative supply to cause CR4 to conduct enough to drive Q3 into the "on" condition.

Figure 1C:
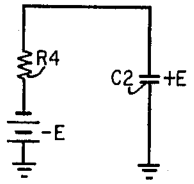
Figure 1D:
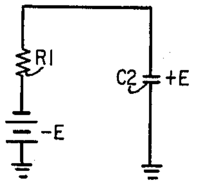

When C2 is sufficiently charged so that negative voltage biases Q3 "on," the base of Q2 becomes grounded since diode CR5 conducts when Q3 is "on." The emitter of Q2 also rises to ground causing a positive pulse to be impressed across C1 which back biases diode CR1 and turns Q1 "off." Resistor dividers R2 and R3 supply a positive voltage to the base of Q1; C1 charges negatively through R4 in series with the negative supply as is illustrated in FIG. 1C. The opposite side of C1 sees approximately ground at the emitter of Q2. As shown in FIG. 1D, C2 discharges negatively through R1 and charges to ground through CR4 and the base emitter junction of Q3.

FIG. 1A shows the charge path for capacitor C1. The impedance from the emitter follower which effectively charges up the capacitor is approximately $R9/BQ2$ where BQ2 is the D.C. beta for transistor Q2. The time required to charge C1 to −E is:

$$t=\frac{4C1R9}{BQ2};\ t\leq td;\ td=\text{pulse duration}$$

The beta of Q2 will vary during the charge up period. The C1 charge current for the pulse duration $$IC1d=\frac{EBQ2}{R9}$$

The value for initial BQ2 has to be limited since the charge current, if excessive, would overdissipate Q2. When C1 is charging, the dissipation in Q2 due to the current from R6 may be neglected provided that this current is one-tenth of the average charge current.

FIG. 1B illustrates the discharge path of C2. The time required to discharge C2 is $$td=R7C2 \ln \frac{(E+EO)}{E}$$

EO is the initial voltage on the capacitor. When EO is equal to E:

$$td=R7C2 \ln 2.$$

FIG. 1C shows the discharge path for C1. The time, *tp*, required to discharge C1 to zero volts is:

$$tp=R4C1 \ln \frac{(E+EO)}{E}$$

EO is the initial voltage in the capacitor. Since in this circuit EO=E, $$tp=R4C1 \ln 2$$

The combination of +E, R2 and R3, is an ICBO compensation network. The combination may be neglected provided that the effective resistance is high with respect to the timing resistor or the effective voltage of the network is low compared with the initial capacitor voltage.

The sum of the C1 discharge current and the emitter current of Q2 is determined by R6. R6 is kept at a maximum value in order not to effect discharge timing.

FIG. 1D illustrates the charge path for C2. Ground is provided to C2 through the base-emitter diode of Q3. The time required to charge C2 is:

$$t=4R1C2$$

where $t \leq tp$; *tp* is the time required to discharge C2 to zero volts.

The minimum value of C1 is limited since the maximum value of R4, the discharge resistor, has to supply base current to Q1. The maximum value of C1 is limited by the minimum value of R9 which partially determined the maximum charging rate of C1 and also determines the saturation requirement of Q3.

Transistor Q1 has to be saturated and also supply the discharge current of C2. Since R4 is fairly large, R1 must be as high as permitted by ICBO to reduce saturation requirements.

The discharge current of C2 is inversely proportional to R7; R7 is made as large as possible to provide enough base drive for Q3 to saturate and also adequate discharge current for C2.

Diodes CR2 and CR3 are silicon diodes. All the transistors are of the germanium type which require less voltage drop to conduct than silicon. Therefore, when Q2 is in the "on" state, the negative supply will find its path to ground grough CR1 and Q1 rather than CR2 and CR3. This insures the turning on of Q1.

The emitter follower gives the circuit reliable starting capability. Assuming all supplies are applied at the same instant or separately and no charge exists on the capacitors, transistors Q1 and Q2 will turn on together, but transistor Q3 will be held off. Q1 cannot turn on before Q2 because of the positive voltage in its base as a result of the positive pulse from the emitter of Q2. If Q2 is initially on, Q1 will turn on due to the negative voltage on its base. As Q1 turns on, Q3 is held "off" by C2. When C2 charges to a sufficiently negative voltage Q3 will turn "on." During the time Q3 is held "off," C1 is charging to a negative voltage through Q2. When Q3 turns on, the pulse appearing at the emitter of Q2 will cause Q1 to be turned off, and thereby initiate oscillation.

Another starting possibility is when Q2 and Q3 turn on together. In this sequence, Q1 will not be held off by a pulse from the emitter of Q2 and will turn on due to the negative voltage on its base. The charge developed by C2 when Q1 is "off," turns off Q3 when Q1 turns on. When short periods with a large ratio of period to pulse duration are involved, Q2 should have a high initial beta to permit C1 to store sufficient energy to turn off Q1. The relative magnitudes of the timing components have to be considered not only for the normal operating condition, but also for starting. As the foregoing indicates, the emitter follower prevents simultaneous saturation of the amplifier transistors, and thereby safeguards the circuit from the possibility of non-starting.

Figure 2:
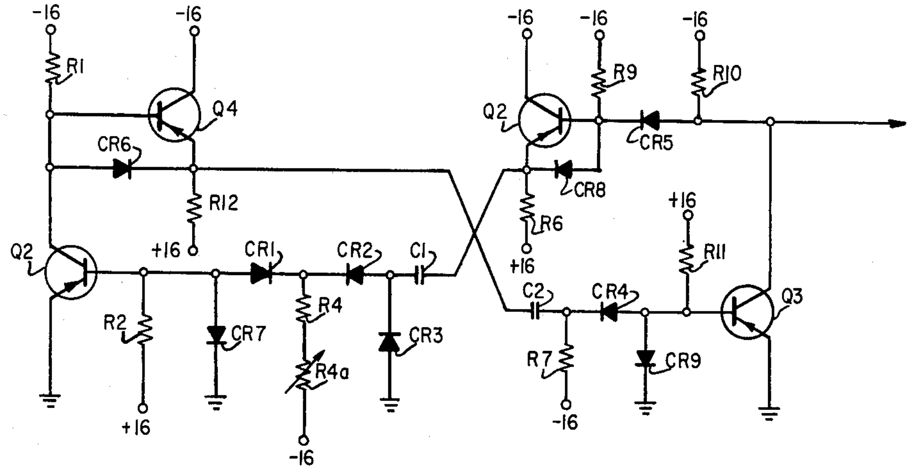
FIGURE 2 is a schematic diagram of an astable multivibrator circuit including two amplifiers and two emitter followers.

FIG. 2 applies the same principle as in the circuit of FIG. 1. The circuit in FIG. 2 has an emitter follower, Q4, included in the timing network interposed between the collector of Q1 and the base of Q3, and an emitter follower, Q2, included in the timing network interposed between the collector of Q3 and the base of Q1. The emitter followers provide low inpedance charging paths for the capacitors connected to their respective emitters. The high impedance which the emitter followers present at their inputs raise the limit of maximum realizable period by minimizing the loading of the amplifying transistors.

Diodes CR6 and CR8 are connected between the base and emitter of Q4 and Q2 respectively. These diodes enable more current to be supplied to the timing capacitors C1 and C2 when the emitter followers are operating at approximately ground potential.

Diodes CR7 and CR9 provide a positive voltage for biasing the amplifying transistors when they are in "off" condition. CR7, R2 and +E comprise the ICBO compensation circuit for transistor Q2; CR9, R11 and +E comprise the ICBO compensation circuit for transistor Q3.

R4*a* adjusts the multivibrator period by varying the discharge time of capacitor C1.

Figure 3:
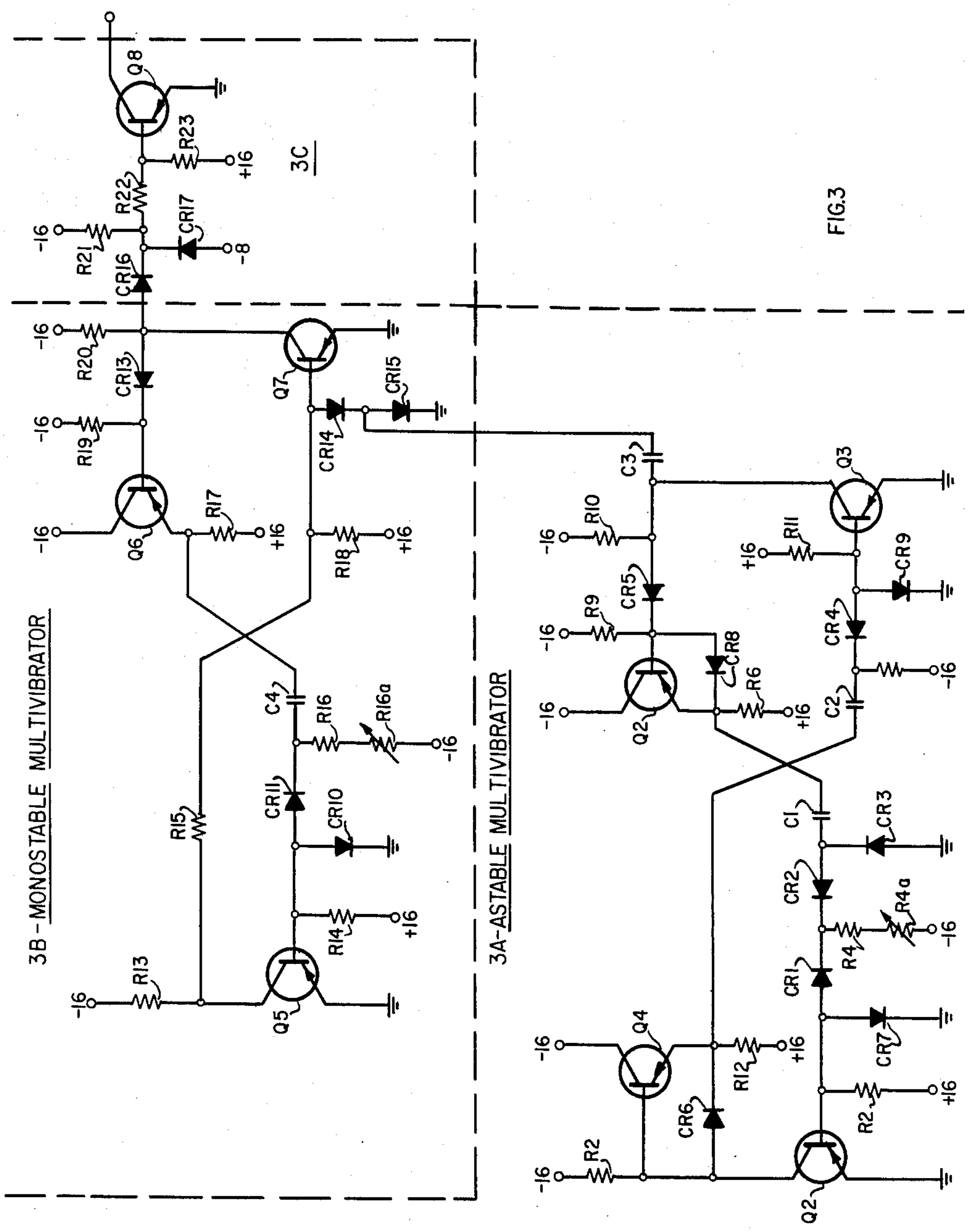
FIGURE 3 is a schematic diagram of a dial pulse generator including an astable multivibrator, a monostable multivibrator, and an output amplifier.

FIG. 3 is a dial pulse generator consisting of an astable multivibrator circuit, a monostable multivibrator circuit, and a buffer amplifier which provide a variable pulse train for outpulsing in the dial pulse mode. The astable generates a pulse which is A.C. coupled into the monostable causing a corresponding pulse in the monostable which generates an output signal.

The multivibrators of the generator have emitter followers in the charge path of each of their timing capacitors. These emitter followers perform similar functions as those in the circuits of FIG. 1 and FIG. 2; low impedance charging path, increases the maximum realizable period, and prevents non starting.

Capacitor C3 coupling into transistor Q7 must be sufficiently large to turn on Q7 when Q3 turns off.

Variable resistor R4*a* serves as a period adjustment for the astable circuit by varying the discharge time of capacitor C1.

Variable resistor R16*a* varies the duty cycle of the monostable circuit by controlling the discharge time of capacitor C4.

While the present invention has been described with respect to a particular embodiment, this description is intended in no way to limit the scope of the invention.

What is claimed is:

1. A multivibrator circuit including:
two amplifying means;
coupling circuits connecting the output of one amplifying means to the input of the other amplifying means and the output of said other amplifying means to the input of said one amplifying means to cause said means to be alternately driven into saturation and cutoff;
at least one of said coupling circuits having a timing network including:
a capacitive means;
voltage follower means connected between said capactive means and the output of said one amplifying means to provide a low resistance charging path for said capacitive means during a portion of a cycle and a reference voltage level for the remainder of said cycle; and
circuit means connected between said capacitive means and the input of said other amplifying means to prevent charging current for said capacitive means from passing through said other amplifying means and to provide for said capacitive means a charging current path to a point of reference potential independent of said other amplifying means.

2. A multivibrator circuit including;

two amplifying means;

coupling circuits connecting the output of one amplifying means to the input of the other amplifying means, and the output of said other amplifying means to the input of said one amplifying means to cause said means to be alternately driven into saturation and cutoff;

a timing network included in at least one of said coupling circuits and including:

a capacitive means;

a resistive means connected to said capacitive means and the input of said one amplifying means;

a diode arrangement including a first and second diode;

said first diode connected on one end to said second diode and said capacitive means, and on the other end to a point of reference, for providing a current path through said first diode from said capacitive means to said reference, said second diode connected on one side to said resistive means, and on the other end to said capacitive means and said first diode, for preventing currents of said capacitive means from finding said reference through said first amplifying means; and a voltage follower means connected between said capacitive means and the output of said other amplifying means, and the voltage of said voltage follower means varying in accordance with the saturation and cutoff condition of said other amplifying means;

whereby said voltage follower means supplies a low resistive path for said capacitive means during a portion of a cycle, and establishes a voltage reference level for the remainder of said cycle.

3. A multivibrator circuit as claimed in claim 2 wherein less voltage being necessary to cause current flow through said one amplifying means than through said diode arrangement.

4. A multivibrator circuit as claimed in claim 2 which includes a third diode connected between said one amplifying means and said diode arrangement, for isolating said one amplifying means, and less voltage being necessary to cause current flow through said one amplifying means and said third diode than through said diode arrangement.

References Cited by the Examiner

UNITED STATES PATENTS 2,874,315 2/59 Reichert ............. 307—88.5

ARTHUR GAUSS, *Primary Examiner.*